US00RE42028E

(19) United States
(12) Reissued Patent
Ewringmann

(10) Patent Number: US RE42,028 E
(45) Date of Reissued Patent: Jan. 18, 2011

(54) HOLDING BAR FOR A ROAD CONSTRUCTION MACHINE

(75) Inventor: Ulrich Ewringmann, Taufkirchen-Potzham (DE)

(73) Assignee: Joseph Voegele AG, Mannheim (DE)

(21) Appl. No.: 29/310,086

(22) Filed: Jul. 8, 2008

Related U.S. Patent Documents

Reissue of:
(64) Patent No.: D. 557,712
Issued: Dec. 18, 2007
Appl. No.: 29/269,036
Filed: Nov. 16, 2006

(30) Foreign Application Priority Data

May 16, 2006 (EM) ..... 000539432

(51) LOC (9) Cl. ..... *15 03*
(52) U.S. Cl. ..... D15/28
(58) Field of Classification Search ..... D15/17, D15/28, 33; D8/380, 381; 280/175; 172/776; 780/311, 312
See application file for complete search history.

(56) References Cited

U.S. PATENT DOCUMENTS

D281,881 S 12/1985 Swartzendruber et al.
D284,668 S 7/1986 Salley Gordon L. et al.
D284,669 S 7/1986 Clark et al.
D284,767 S 7/1986 Clark et al.
D285,081 S 8/1986 Wood

*Primary Examiner*—Philip S Hyder
*Assistant Examiner*—Mark A Goodwin
(74) *Attorney, Agent, or Firm*—Fish & Richardson P.C.

(57) CLAIM

The ornamental design for a holding bar for a road construction machine, as shown and described.

DESCRIPTION

FIG. 1 is a perspective view of a holding bar for a road construction machine showing my new design;
FIG. 2 is a left elevation view thereof;
FIG. 3 is a front elevation view thereof
FIG. 4 is a right elevation view thereof;
FIG. 5 is a rear elevation view thereof;
FIG. 6 is a bottom plan view thereof; and,
FIG. 7 is a top plan view thereof. Dashed lines showing apertures in the holding bar for a road construction machine are included for the purpose of illustrating means for fastening the holding bar to the road construction machine, and form no part of the claimed design.

1 Claim, 3 Drawing Sheets

Figure 1:
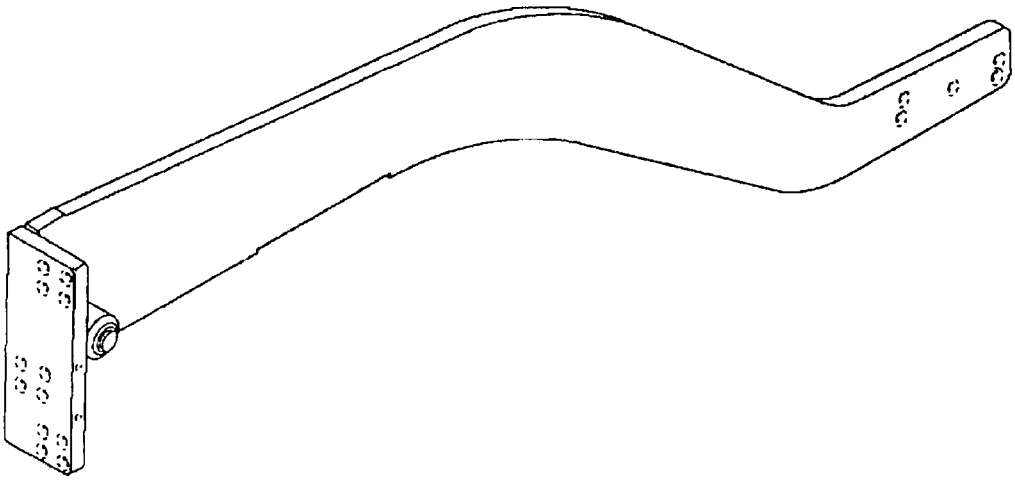
Figure 2:
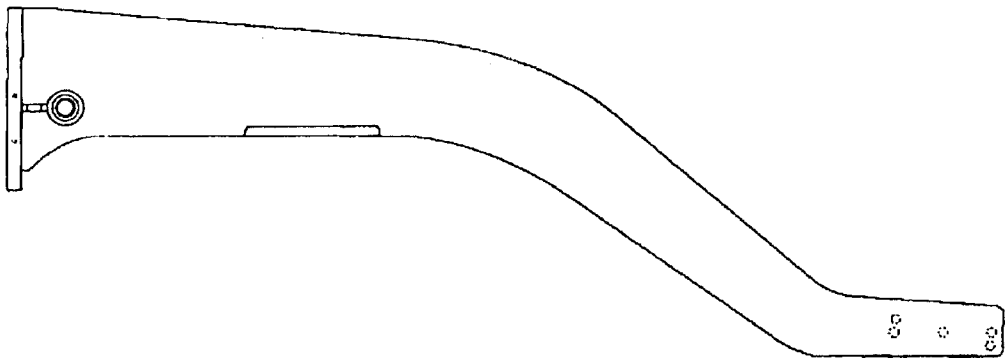
Figure 3:
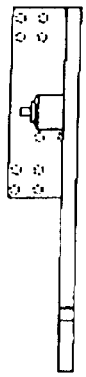
Figure 5:
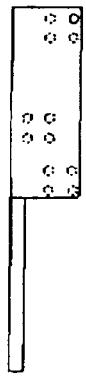
Figure 4:
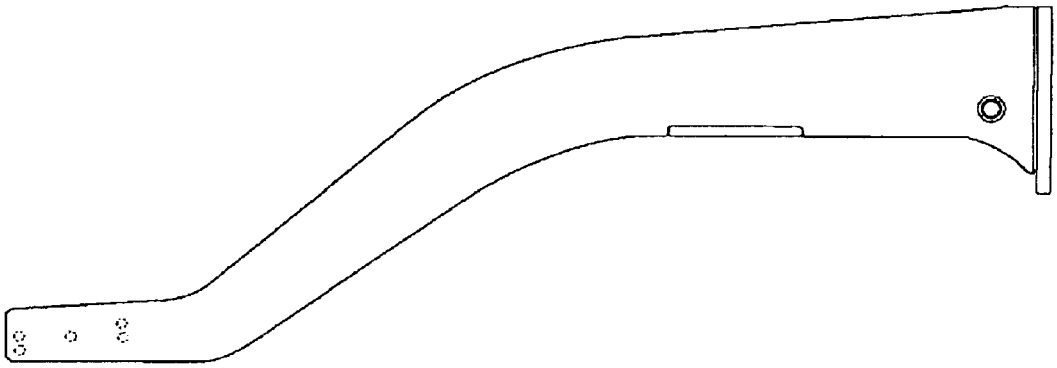
Figure 6:
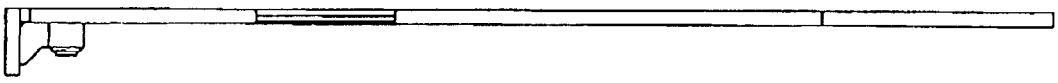
Figure 7:
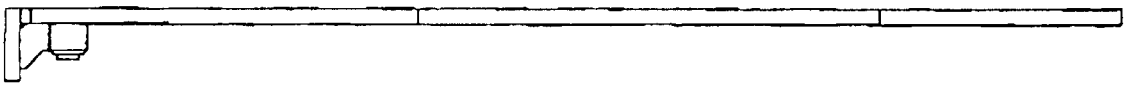

Matter enclosed in heavy brackets [ ] appears in the original patent but forms no part of this reissue specification; matter printed in italics indicates the additions made by reissue.